H. A. CARPENTER & R. L. HIBBARD.
MACHINE FOR CHARGING AND DISCHARGING GAS RETORTS.
APPLICATION FILED NOV. 29, 1909.

1,144,165.

Patented June 22, 1915.
9 SHEETS—SHEET 3.

WITNESSES:

INVENTORS

BY
ATTORNEY

H. A. CARPENTER & R. L. HIBBARD.
MACHINE FOR CHARGING AND DISCHARGING GAS RETORTS.
APPLICATION FILED NOV. 29, 1909.

1,144,165.

Patented June 22, 1915.
9 SHEETS—SHEET 4.

WITNESSES:

INVENTORS

ATTORNEY

H. A. CARPENTER & R. L. HIBBARD.
MACHINE FOR CHARGING AND DISCHARGING GAS RETORTS.
APPLICATION FILED NOV. 29, 1909.

1,144,165.

Patented June 22, 1915.
9 SHEETS—SHEET 5.

WITNESSES:

INVENTORS

BY

ATTORNEY

H. A. CARPENTER & R. L. HIBBARD.
MACHINE FOR CHARGING AND DISCHARGING GAS RETORTS.
APPLICATION FILED NOV. 29, 1909.

1,144,165.

Patented June 22, 1915.
9 SHEETS—SHEET 6.

WITNESSES:

INVENTORS
ATTORNEY

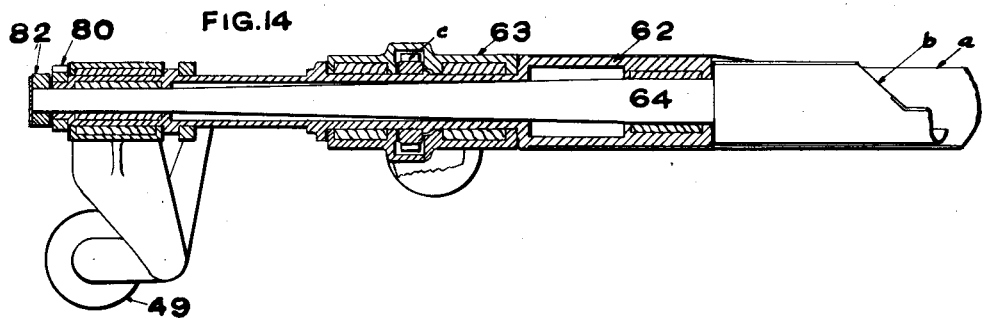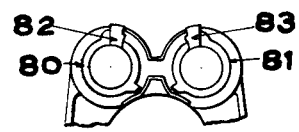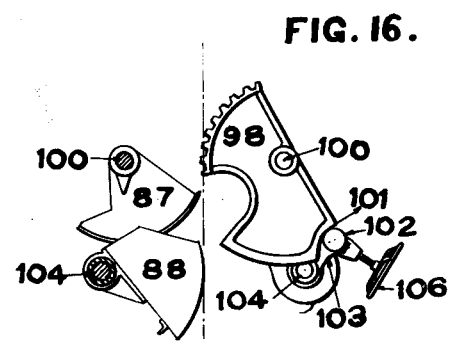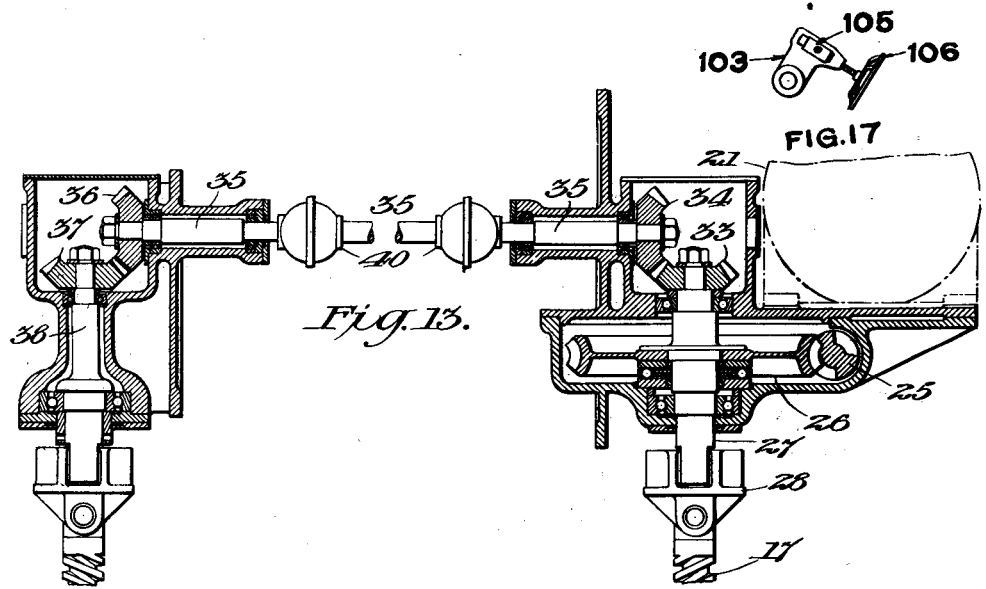

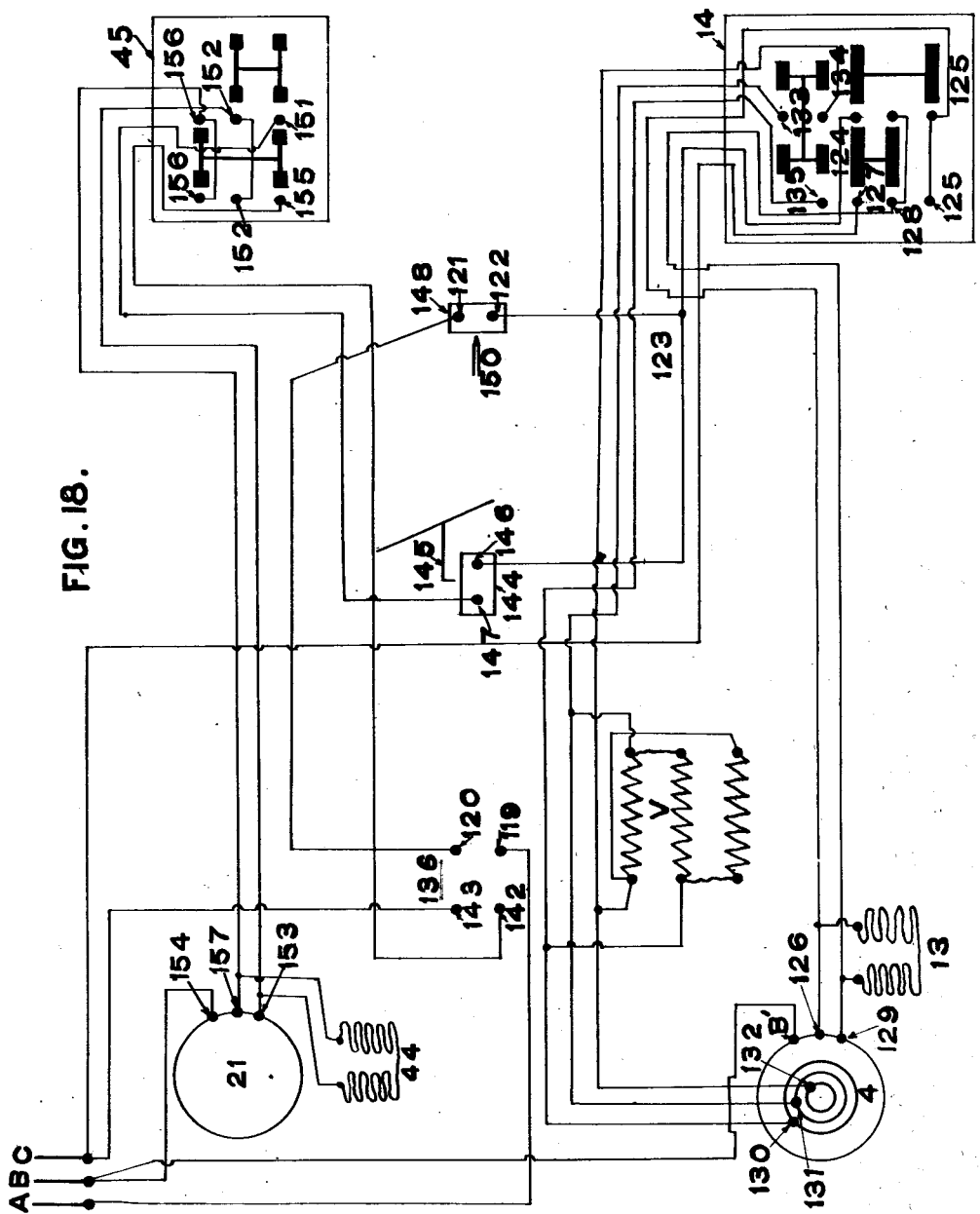

H. A. CARPENTER & R. L. HIBBARD.
MACHINE FOR CHARGING AND DISCHARGING GAS RETORTS.
APPLICATION FILED NOV. 29, 1909.
1,144,165.
Patented June 22, 1915.
9 SHEETS—SHEET 9.
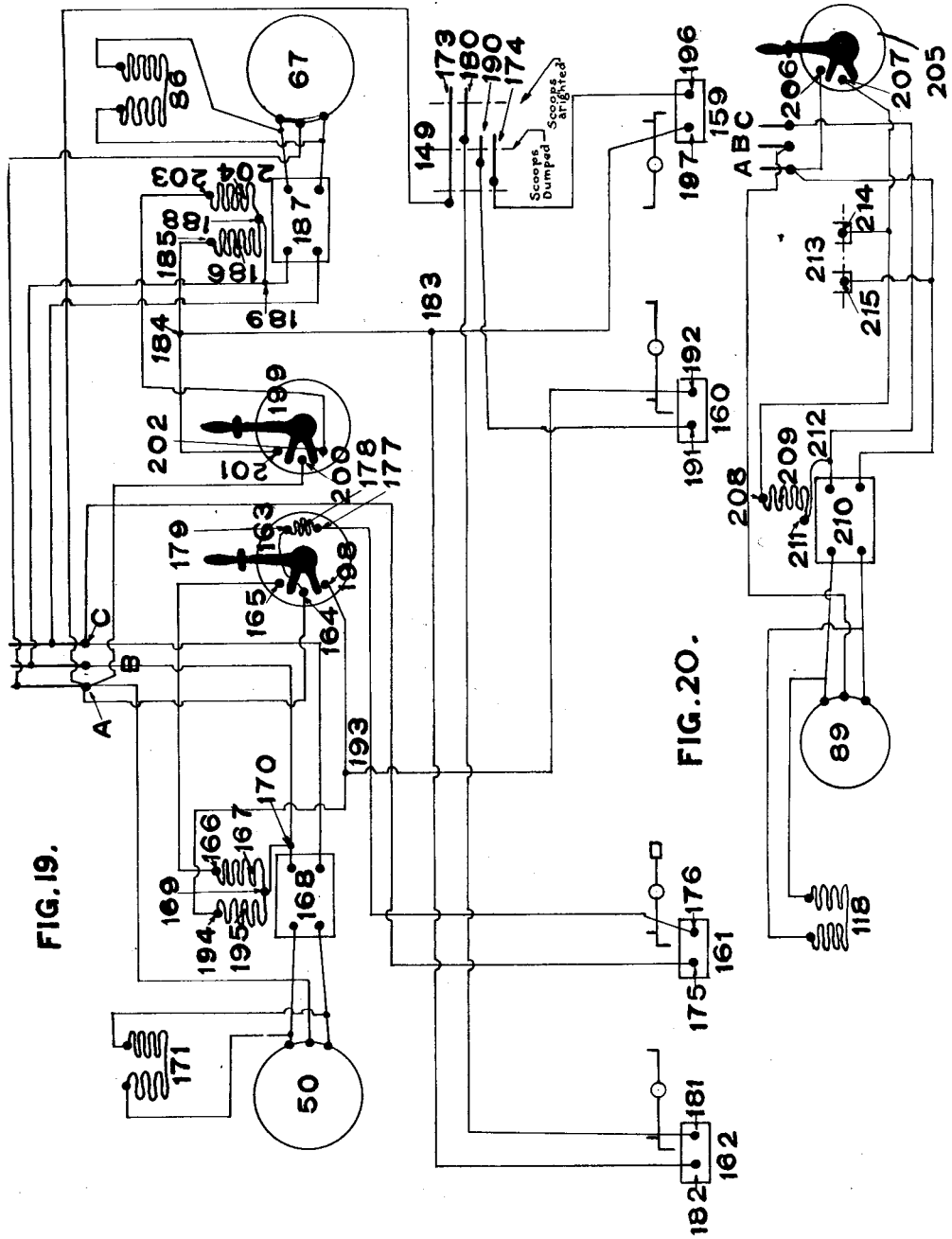

UNITED STATES PATENT OFFICE.

HENRY A. CARPENTER AND ROBERT L. HIBBARD, OF SEWICKLEY, PENNSYLVANIA, ASSIGNORS TO RITER-CONLEY MANUFACTURING COMPANY, OF PITTSBURGH, PENNSYLVANIA, A CORPORATION OF NEW JERSEY.

MACHINE FOR CHARGING AND DISCHARGING GAS-RETORTS.

1,144,165.        Specification of Letters Patent.     Patented June 22, 1915.

Application filed November 29, 1909. Serial No. 530,383.

*To all whom it may concern:*

Be it known that we, HENRY A. CARPENTER and ROBERT L. HIBBARD, citizens of the United States, residing at Sewickley, in the county of Allegheny and State of Pennsylvania, have jointly invented a new and useful Improvement in Machines for Charging and Discharging Gas-Retorts, of which improvement the following is a specification.

Our invention relates to improvement in apparatuses or machines for charging and discharging horizontally arranged gas retorts.

The object of our invention is to produce an electric substantially automatically operated machine for charging and discharging horizontally disposed gas retorts. We accomplish this object by means of the device hereinafter fully described, reference being had to the accompanying drawings, forming part hereof, in which—

Figure 1:
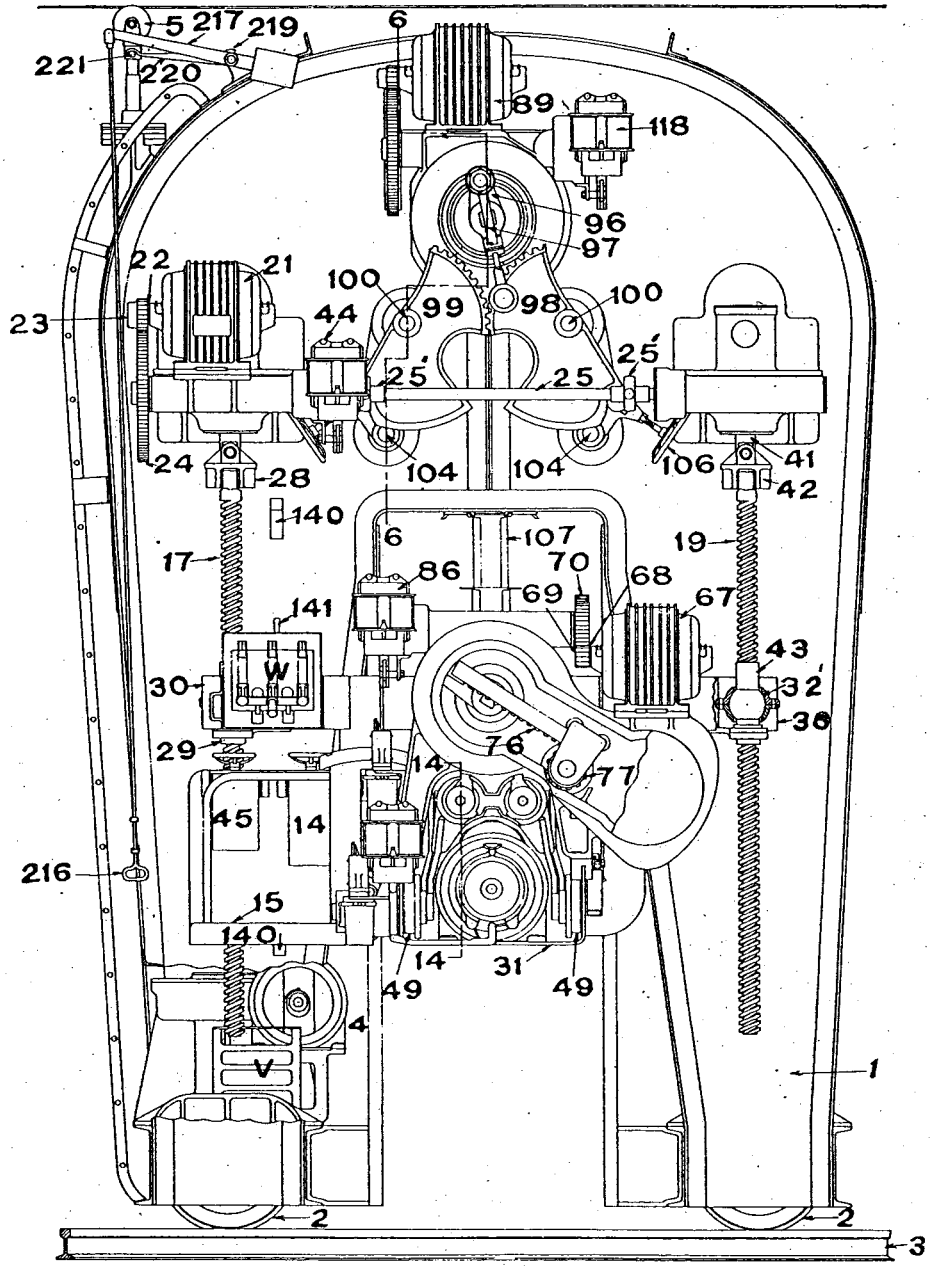
Figure 2:
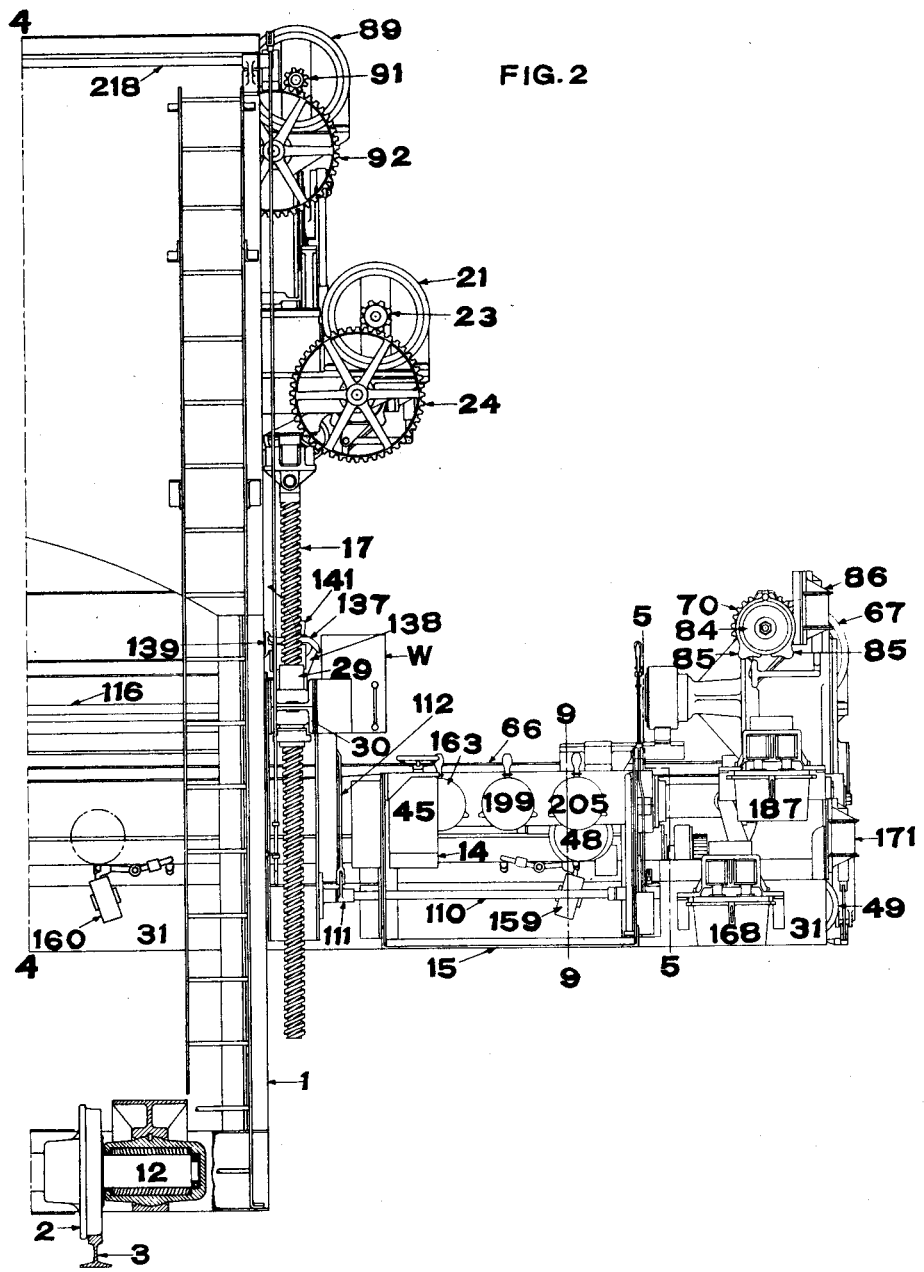
Figure 3:
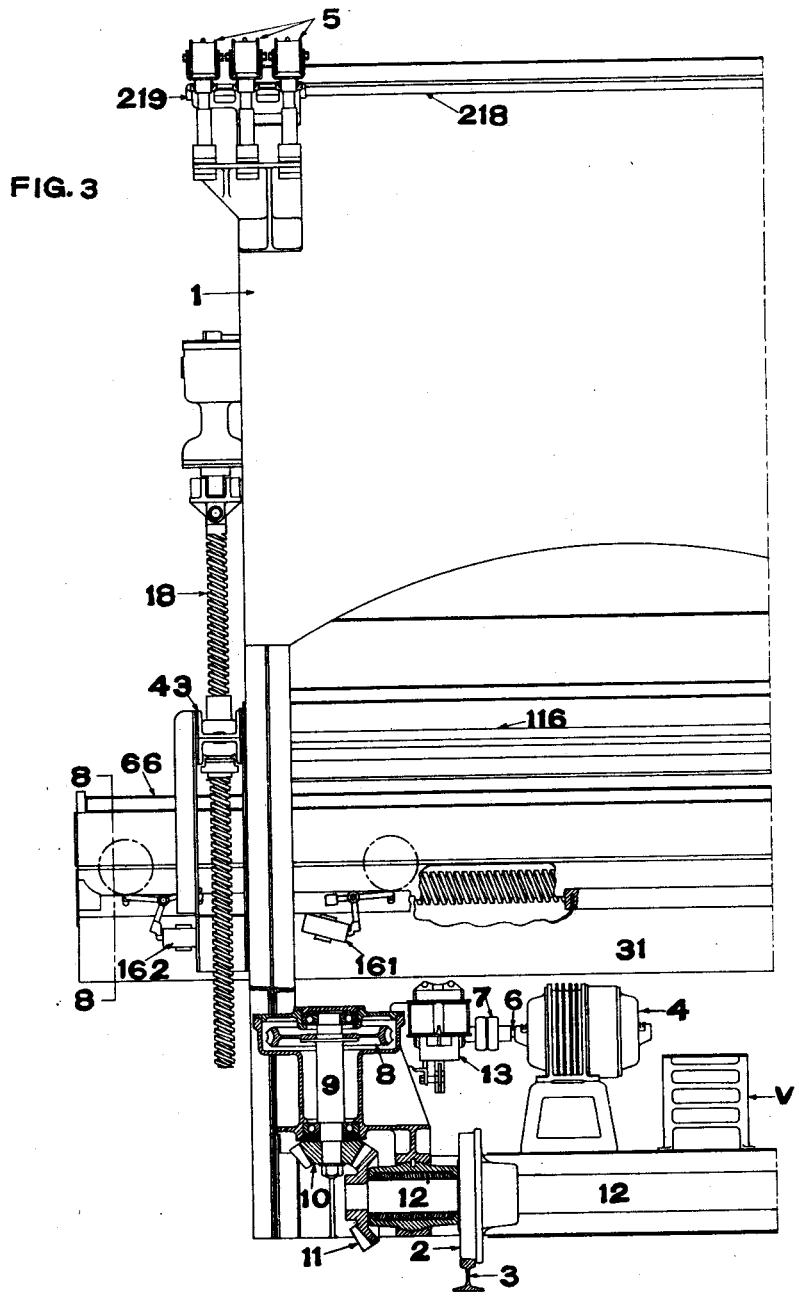
Figure 4:
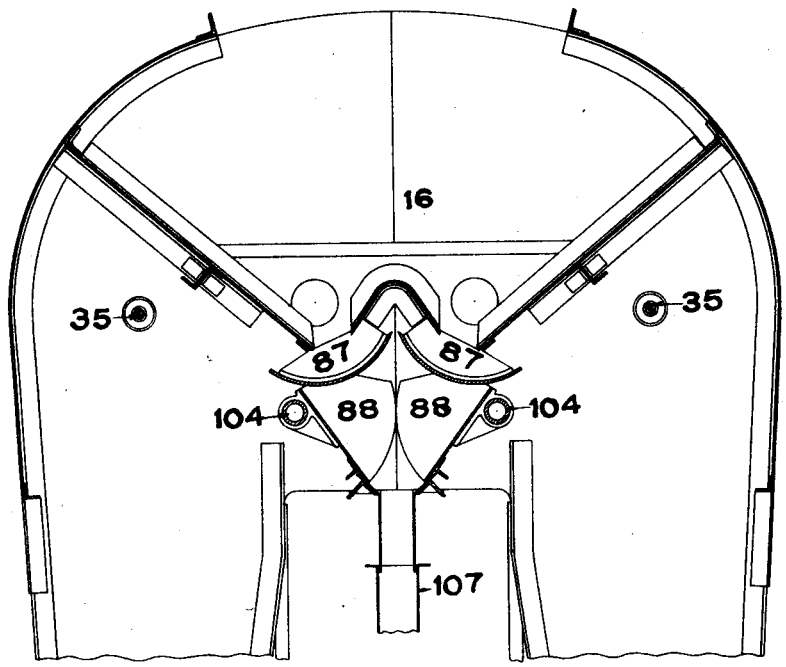
Figure 5:
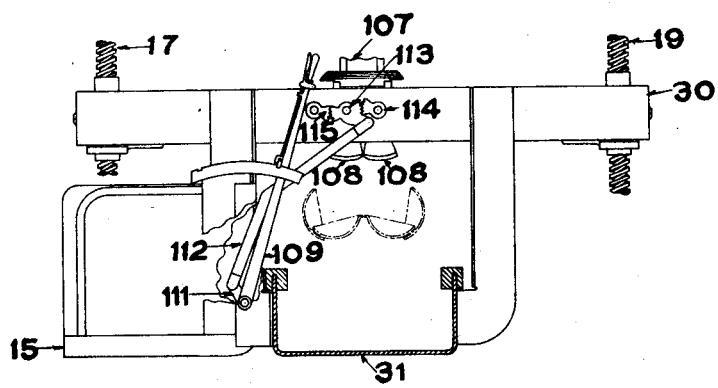
Figure 6:
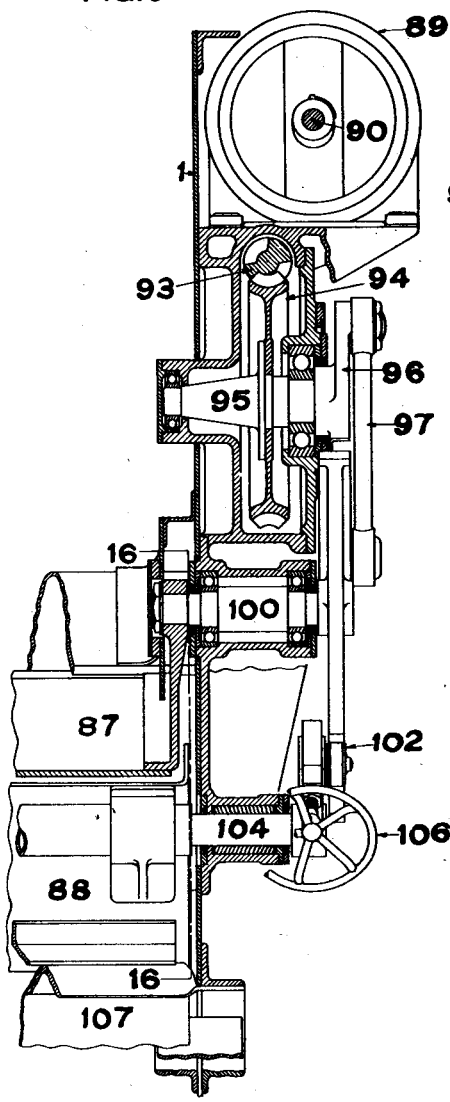
Figure 7:
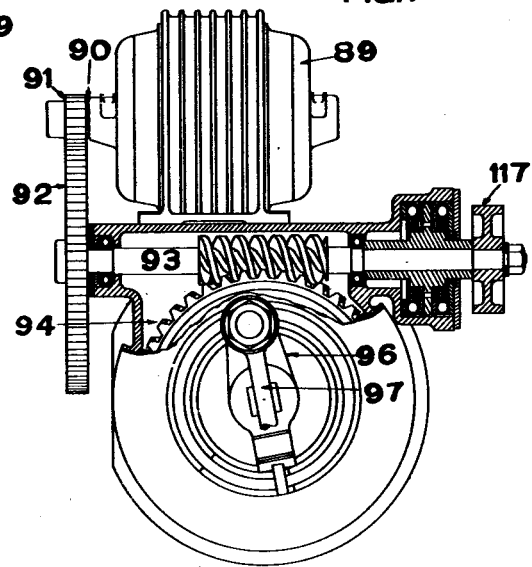
Figure 8:
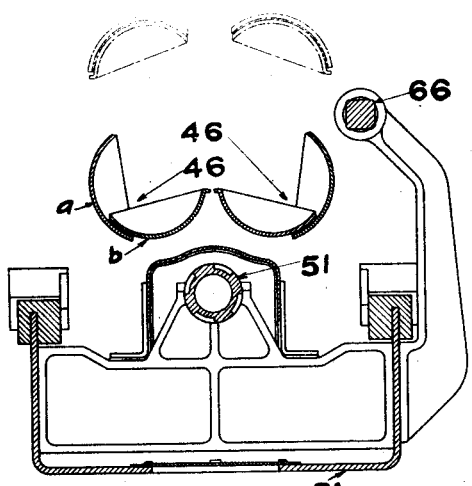
Figure 9:
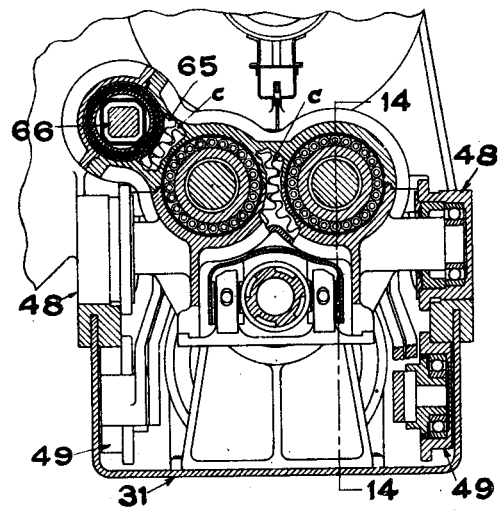
Figure 10:
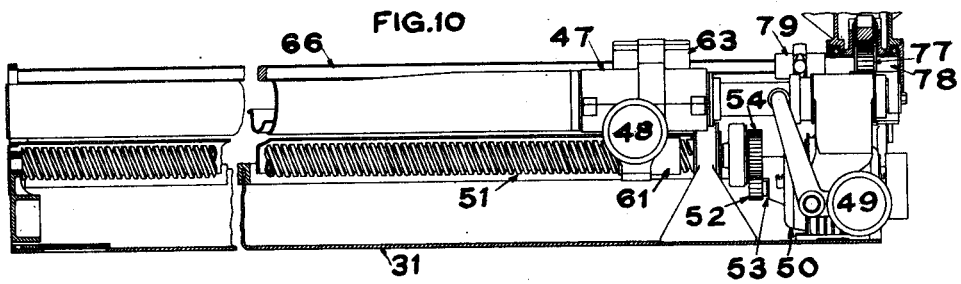
Figure 12:
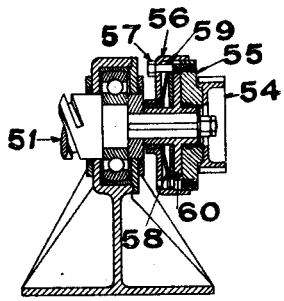
Figure 11:
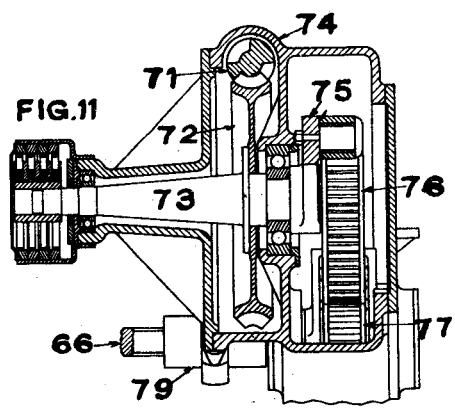

Figure 1 is an elevation of the side of the machine farthest removed from the retort bench herein called an end elevation. Fig. 2 is a side elevation of the portion of the machine farthest removed from the retort benches. Fig. 3 is a side elevation of the part of the machine adjacent to retorts and to that shown in Fig. 2. Fig. 4 is a section on line 4—4 of Fig. 2. Fig. 5 is a section on line 5—5 of Fig. 2. Fig. 6 is a section on line 6—6 of Fig. 1. Fig. 7 is an elevation of the feeder motor and mechanism actuated thereby partly in section. Fig. 8 is a section on line 8—8 of Fig. 3. Fig. 9 is a section on line 9—9 of Fig. 2. Fig. 10 is a side elevation partly in section of carriage screw and mechanism to operate same. Fig. 11 is a sectional view of mechanism which turns the scoops and of the automatic switch. Fig. 12 is a sectional view of clutch mechanism for operating the carriage screw. Fig. 13 is a sectional view of the motor and the actuating mechanism which operates the several suspension screws. Fig. 14 is a section of carriage on line 14—14 of Fig. 1 and on line 14—14 of Fig. 9. Fig. 15 is a rear elevation of knockers. Fig. 16 is an elevation of one of the sections and of the adjusting screw and a section on line 16—16 of Fig. 6. Fig. 17 is a detail of adjusting screw. Fig. 18 is a diagrammatic view of the circuits and switches to operate hoist and travel motors. Fig. 19 is a diagrammatic view of the circuits and switches to operate carriage and scoop automatic control. Fig. 20 is a diagrammatic view of the circuits and switches to operate the feeder automatic control.

Referring to said drawings, 1 is a frame which is mounted on wheels 2 and is adapted to travel on ways or tracks 3 along the face or front of the retort bench (not shown), being propelled or caused to travel on said track by electric current carried to the propelling motor 4 by means of the trolleys 5 and suitable conductors as hereinafter set forth. Power is transmitted from said motor 4 to the shaft 6 thereof which is connected and transmits power to a worm shaft by means of a double universal joint 7. The said worm shaft meshes with and transmits power to the worm wheel 8 which is mounted on the upper end of the vertically disposed shaft 9, on the lower end of which is mounted the bevel wheel 10 which meshes with and transmits power to the bevel wheel 11 mounted on the axle 12 of the frame 1. The worm shaft is controlled by a brake (not shown, but which is similar to that shown in Fig. 2 and hereinafter described) actuated by the solenoid 13, and said motor is operated by the controller 14 mounted on the operating platform 15. In the top of the machine extending longitudinally thereof is located a hopper 16 adapted to contain coal to be charged into the different retorts as hereinafter set forth.

The retorts are arranged in rows on different horizontal planes and the mechanism for conveying coal thereto and discharging the coke therefrom is capable of being moved vertically to enable these operations to be performed and to this purpose all the movable mechanism is supported upon four vertically disposed screws, three of which, 17, 18, 19, are shown, screws 17 and 19 being at one end of the machine and screws 18 and the screw not shown being relatively located at the opposite end of the machine or frame. The said screws are operated or driven by the motor 21 which is suitably supported in the upper end of the frame at one side thereof, through the following mechanism, viz., the shaft 22 of the motor on which is mounted the spur wheel 23 which meshes with and transmits power to the spur wheel 24 mounted on one end of the worm shaft 25. The said worm shaft 25 extends transversely of the machine, having double universal joint 25', and meshes with the worm wheel 26 mounted on the vertically disposed shaft 27 which is connected to the screw 17 by means of the single universal joint 28, the said screw operating in a nut 29 supported in one of the girders 30 (from which the carriage track 31 is suspended) by means of a ball and socket connection or joint 32; the mechanism just described operates the screw 17 in its nut, and the power generated is transmitted through the bevel wheel 33 mounted on the upper end of the shaft 27 to the bevel wheel 34 on one end of the horizontally disposed shaft 35 which extends longitudinally of the machine at one side thereof, the opposite end of the said shaft 35 having a similar bevel wheel 36 mounted thereon which meshes with a bevel wheel 37 mounted on the upper end of the shaft 38 which is connected to the screw 18 by means of the single universal joint 39. The said shaft 35 is provided with double universal joint 40 to insure the greatest possible flexibility and to reduce the possibility of binding it to a minimum. The worm on the end of the worm shaft 25 opposite to that on which the spur wheel 24 is mounted meshes with a worm wheel (similar to worm wheel 26) mounted on the upper end of shaft 41 which is connected to hoisting screw 19 by a single universal joint 42. The said screw 19 operates in a nut 43 (similar in all respects to nut 29) supported in the side of girder 30 at the opposite end to 29, being attached thereto by means of a ball and socket joint 32' (similar in all respects to joint 32). Upon the upper end of shaft 41 is mounted a bevel gear (not shown) which is similar in all respects to bevel gear 33 mounted on shaft 27. Power is transmitted from said shaft 41 through the gears and shaft connections identical with those shown in Fig. 13, to a hoisting screw (not shown) which is in all respects similar to screws 17 and 19, and is attached to the girder 43 in the same manner as screw 19. The worm shaft 25 is controlled by a brake (not shown) which is actuated by a solenoid 44 and said motor 21 is operated by the controller 45 on the operating platform 15. The motor 21 and the connections therefrom to the girders as described is for the purpose of elevating and lowering the carriage track 31 suspended from the said girders and the mechanism mounted on said carriage so as to bring the scoops 46, 46, mounted in the carriage 47, the wheels 48, 49, of which are adapted to travel on said track, when the machine is opposite the various retorts and in position to charge coal into and discharge coke from said retorts. The front ends of the scoop members 46 might be of any suitable construction, although they are preferably closed so as to form an effective ram for ejecting the coke from the retorts. The said carriage and scoops mounted thereon is caused to travel on the track 31 by means of the following mechanism, viz:—A motor 50 mounted on said track 31 transmits power to a hollow screw 51 which extends the length of the machine, through the medium of a spur gear 52 mounted on the end of the motor shaft 53 which gear meshes with the spur gear 54 to transmit power to screw 51 as follows: Said gear 54 is bolted to plate 55 to which is fastened the dished plate 56 by bolts 57, 57 which bolts serve to tighten or loosen dished spring 58, thereby governing the pressure of plates 55 and 59 against the hub 60 which is provided with cork inserts or friction surfaces, and is keyed to said screw. The gripping power of this clutch mechanism transmits sufficient power to the screw to push the charging and discharging mechanism under all usual and normal conditions but in the event of the said mechanism encountering any obstacle which will prevent a greater pressure than that which the friction clutch is adapted to resist, the clutch mechanism would enable the motor shaft to rotate on the hub 60 without affecting the screw.

The screw is connected to the carriage by means of the nut 61, whereby, when the screw is actuated, the carriage and mechanism mounted thereon is caused to travel in a direction dependent upon the direction of rotation of the motor. The said scoop comprises two pair of long trough-shaped members or sections, a, b, the outer members or sections a at their rear ends being attached to the hollow shafts 62 which are rotatably mounted in the main carriage casting 63, and the inner members or sections b being attached to shafts 64 which are rotatably mounted in the said hollow shafts 62. The said shafts 62 are geared together, having serrations or teeth c for the purpose, and are driven by power transmitted thereto from the gear wheel 65 slidably mounted on the square shaft 66. The said shaft 66 is actuated, through the following mechanism, viz:—A motor 67, the power shaft 68 of which has mounted thereon a spur gear 69, which meshes with and transmits power to the spur wheel 70 mounted on the worm shaft 71 which extends transversely of the machine. The said spur wheel 70 transmits power to the worm shaft 71 which meshes with and transmits power to the worm wheel 72 mounted on the shaft 73 mounted in the casting 74, the outer end of said shaft having a crank 75 which actuates a floating rack 76 which meshes with and operates a gear wheel 77 mounted on the shaft 78 which is connected to the square shaft 66 by means of a single universal joint 79. The outer shafts 62, 62, are caused to rotate or turn by means of the mechanism just described, and the inner shafts 64, 64, are carried or driven by the outer shafts, by means of knockers 80, 81, mounted on the outer shafts and knockers 82, 83 on the inner shafts 64, at the extremities of the shafts. The said worm shaft 71 is provided with a brake wheel 84 which is engaged by two brake shoes 85, 85 which are provided with cork inserts; the said shoes are actuated by a solenoid 86.

As will be understood, the individual movements of the scoop members $a$ and $b$ are substantially rotational (the movements of the members into and out of the retort being provided by the carriage mechanism) these members ($a$ and $b$) having substantially two positions of rest in connection with this rotational movement, these positions being shown more particularly in Fig. 8 in which the members are shown in full lines as being in what may be termed a distended position, and in dotted lines in what may be termed a nested position, the movements between these positions being provided by the mechanism described. For instance, in passing from the full line to the dotted line position (shown in Fig. 8) using the two members $a$ and $b$ at the left as an example, the general motion is counter-clockwise, the member $a$ first moving independent of member $b$ until engagement is made between the knockers shown in Fig. 15, at which time the two members are practically nested; the further rotational movement carries the nested members through the coal which is carried by the scoop until the nested members are positioned above the charge. Similarly, the members $a$ and $b$ at the right in said Fig. 8 have their movements in a clockwise direction. After the scoops have been withdrawn, with the members in the inverted nested position, they are returned to distended position by a reversal of these movements. The scoops being in proper position with relation to the hopper 16 coal is delivered from said hopper, the discharge therefrom being controlled by the upper feeder gates 87, 87 and the lower feeder gates 88, 88, the said gates being operated as follows, viz:—Power is transmitted from the motor 89 through the power shaft 90 to the spur gear 91 thereon, to the spur gear 92 mounted on the worm shaft 93, the worm of which meshes with and transmits power to the worm wheel 94 mounted on shaft 95, the outer end of which has mounted thereon a crank 96, which is connected to one end of the connecting rod 97, the opposite end of said rod being attached to the gear sector 98 which meshes with sector 99. Said sectors are mounted on shafts 100, 100, the inner ends of which are connected to gates 87, 87. The said gear sectors are provided with cams 101 on the surfaces of which cam rollers 102 are adapted to operate, the said rollers being attached to the cam levers 103, 103 which are mounted on one end of shafts 104, 104, which are attached to the lower feeder gates 88, 88. The cam rollers 102 are mounted on slides 105 which are operated by hand wheel and screw 106 to regulate the size of the charge, by controlling the opening of said gates. The coal is discharged from the gates 88, 88 to the telescope 107 and from said telescope to the scoop through gates 108, 108 which are operated by hand lever 109 mounted on shaft 110, on the opposite end of which is mounted lever 111. To said lever 111 one end of connecting bar 112 is attached, the opposite end of said bar being attached to gear sector 113, which is connected by shaft (not shown) to one gate 108 and which meshes with sector 114, connected in like manner to the other gate 108; sector 113 also meshes with sector 115 which is mounted on shaft 116, upon the opposite end of which similar gear sectors, driving similar gate mechanism are mounted. Upon the worm shaft 93 a brake wheel 117 is mounted which is adapted to be engaged by brake shoes similar in all respects to brake shoes 85, 85, and is operated by solenoid 118.

The trolleys 5 are lowered from line wires A, B, and C as follows, viz:—Hand rod 216 operates lever 217 attached to one end of shaft 218 extending longitudinally of the machine, the opposite end of said shaft has mounted thereon a knocker 219 which engages with the levers 220 pivotally mounted on said shaft and when said hand rod is pulled down causes said knocker to move said levers, which pass over and engage upon pins 221 of the trolley harps, moving the same downward and out of contact with the line wires aforesaid.

One of the very important features of our invention is embodied in the manner of connecting the carriage screw to the motor which drives same. The clutch connection being sufficient to transmit power sufficient to actuate the carriage mechanism under usual conditions, but not sufficient to operate the screw against unusual resistance, in which event the motor shaft will rotate in the hub without actuating the screw.

The circuits which are brought from the trolleys 5, direct to circuit breaker W, from which they convey current to the various motors are illustrated in Figs. 18, 19 and 20.

From the above, it will be understood that each of the main mechanisms is operated by means of independent motors these being the travel motor 4, the hoist motor 21, carriage motor 50, scoops motor 67, and the feeder motor 89. For the purpose of providing efficient control of the operations of these motors, we preferably employ the three phase system of wiring in which power is delivered by three line wires, between any pair of which exists an equal voltage which will drive current through a conductor connected between any pair. This permits of the use of controlling solenoids which are connected to be operated by any pair of line wires. Each of the line wires must be operatively connected to a motor to operate it, and the control of the motor is by making or breaking the circuit through any pair of these line wires. Various types of switches are employed, as hereinafter indicated, the particular construction being generally of well known types and not specifically shown herein. Each of the motors are operated by suitable control mechanism, all having manually operable control means, in addition to which certain of the motors have automatic controls, by means of which a predetermined sequence of operation may be provided.

The various control and operating circuits are shown diagrammatically in Figs. 18, 19 and 20, in which the motors above indicated are shown, together with the controllers and switches which are employed in connection with the operation of the machine, Fig. 18 showing the travel and hoist control systems, Fig. 19 showing the carriage and scoop control systems, and Fig. 20 the feeder control system. Fig. 19 also discloses certain solenoid operated reversing switches, these being indicated at 168 and 187, these switches acting to make and break the line connections and reverse them through the operation of separate solenoids. Fig. 20 also shows a solenoid operated make and break switch 210.

The manual controllers for the various circuits are indicated as (travel) 14, (hoist) 45, (carriage manual) 163, (scoop manual) 199, and (feeder manual) 205. In addition, automatic controls are shown at 149 (Fig. 19) which controls the scoop dumping and righting operation, and at 159, 160, 161 and 162 (Fig. 19) the latter showing make and break devices which are individually automatically manipulated in a predetermined sequence by the travel of the carriage, these latter automatics acting as timing elements in the general operation.

The carriage manual controller 163 differs from the controllers 199 and 205 in that it is automatically locked in moving in the direction to close the carriage forward circuit, this locked condition being released automatically by the operation of a solenoid 178 as presently described.

The automatic switch 149 is operated by the scoop motor, while the make and break devices 159, 160, 161 and 162 are operated by the travel of a wheel 48 of the carriage, switch 161 being an automatic make and break switch while the other three switches have their make and break movements by the operation of wheel 48. Switch 213 is an automatic switch controlled by movements of the motor 89.

The switch 136 (Fig. 18) is a suitable make and break switch mounted in the hoist and travel circuits, the switch operating in connection with one line of the travel circuit and in connection with two lines of the hoist circuit. This switch is a safety switch to prevent movements of the hoist instrumentality beyond proper limits in either direction in order that damage to the equipment will be prevented under the negligence of the operator. This switch is normally closed, but operates to break the circuit by the following mechanism, the switch being mounted on the girder 30: An arm 137 has its extreme outer end pivoted to switch frame 138, the opposite end of said arm being adapted to engage the upper end of a notched lever 139 fastened to the switch frame 138. The lower end of said notched lever is provided with a roller which engages knockers 140, these knockers being secured to the frame of the machine at spaced-apart points equal to the working stroke of the hoist. The arm 137 is provided with a handle 141, and has its lower side provided with plungers adapted to contact with four fingers (indicated at 119, 120, 142 and 143 in Fig. 18) of the switch 136. The arm 137 is held in contact with notched lever 139 by means of a spiral spring. It will be obvious that during the vertical hoist operations, the roller of the notched lever may engage one or the other of the knockers 140, depending upon the position in the hoist stroke; this engagement releases the lever from engagement with the arm 137, whereupon the spring coöperating with said arm acts to throw the arm 137 backward, which movement in turn carries the plungers out of contact with the fingers of the switch, breaking the circuit of two of the line wires of the hoist mechanism. As one of these line wires is also a part of the travel circuit, this breaking at this point will prevent movement of the travel motor as well.

Switch 144 (Fig. 18) operates entirely in the hoisting circuit, its object being to prevent hoisting operations when the telescope gates 108, 108 are closed, at which time the chute formed of the telescope sections 107 carries a charge of coal. If the hoist instrumentality was operated at this time, damage to the equipment would be possible. This switch is controlled by the position of lever 109, the connections between switch and lever being provided with a plunger 145 which is adapted to swing into contact engagement with contacts 146 and 147 of the switch 144 when the lever is at its extreme rear position with the gates 108 open. In this position the one lead wire which this switch controls is closed and permits operation of the hoist motor through manipulation of the hoist controller 45; when the lever is out of this position, the contact engagement of the plunger 145 with contacts 146 and 147 is broken, thus cutting one of the lines to the hoist motor.

The switch indicated at 148 (Fig. 18) which may be termed a hoist and travel safety switch, is a make and break device in one of the lines of both hoist and travel circuits. This switch is controlled by the movements of the carriage, the latter carrying an arm 150 which is adapted to provide contact engagement with the fingers 121 and 122 when the carriage is in its rear position, at which time the scoops are in their rear positions, and the travel or hoist operations may take place without damaging the equipment. When the carriage begins its forward movement, it withdraws the arm 150 out of contact with the fingers and thus automatically breaks both travel and hoist circuits and prevents operation of these motors, the circuits remaining broken during the forward and return movements of the carriage, being closed only when the carriage reaches the rear position.

The controller 45 is a reversing controller operated by movements in opposite directions. The controller 14, is similarly operated but carries additional contacts which are adapted to throw into and out of circuit a resistance element V which is connected up with three commutator rings 130, 131 and 132 mounted on the motor shaft, this resistance element and its circuit serving to provide for different speeds of the travel motors. When the element V is active (through the non-closing of contacts in the controller 14) the motor will run at slow speed, while a movement of the controller to short circuit this resistance circuit in the controller 14 will cut out the resistance element and provide for the motor running at high speed.

The travel of the machine is under the control of controller 14 through the following circuits, it being understood that the movement of the controller in one direction will cause the motor to travel in one direction, a reversal of the direction of movement of the controller causing a corresponding change in the direction of movement of the motor 4.

Assuming the controller 14 to be moved toward the left in Fig. 18, with switches 136 and 148 closed, the lines to the motor 4 will be as follows: from lead line A to the fingers 119 and 120 of switch 136, to fingers 121 and 122 of switch 148, to point 123, contact point 124, through the bridge connection to contact point 125, to point 126 of the motor; lead line B runs direct to the point B' of the motor; lead line C to contact point 127 through bridge connection to contact point 128, to point 129 on the motor. If the movement of the controller has been but a single notch, the connections thus described will provide slow speed to the motor 4, the resistance element V being in circuit. If the controller be moved another notch in the same direction, the resistance element will be short circuited through the movement of the bridging members into contact with the contact points 133, 134, and 135, thus providing a running of the motor at high speed. If the controller 14 is moved in the opposite direction from the neutral, viz., toward the right in Fig. 18, the lines from lead lines A and C to the motor will be reversed, lead line A running to contact point 124 as before, but in this position cooperating with a different bridge connection which connects contact point 124 with point 128, which leads to the point 129 on motor 4, while lead line C, after passing to contact point 127 as before, engages with a different bridging connection which connects point 127 with contact point 125, and thus leads to point 126 on the motor, reversing lines A and C, line B leading direct to the motor. If this movement is continued another notch, the resistance element V is then short-circuited, changing the speed of the motor from the slow speed of the first notch. This provides a manual control of the operation of the motor 4 and provides for travel of the charging machine backward and forward in front of the retorts under the control of the operator. However, this travel is possible only when the mechanisms of the charging machine are in proper position, the lead line A being provided at two separate points with switch cut-outs (136 and 148), either of which will act to break the connection of this lead line with the motor and prevent its operation.

The circuit of the hoisting motor is controlled by the manual controller 45, this operating circuit being arranged to provide for reversal of the direction of the movement of the motor at will. The several lines to the motor from lead lines A, B, and C are as follows, it being assumed that the three switches 136, 145 and 148 are closed:—from lead line A through contact fingers 119 and 120 of switch 136, contact fingers 121 and 122 of switch 148, point 123, points 146 and 147 of switch 144, to contact point 151; lead line B leads direct to motor 21 at point 154; while lead line C leads to the fingers 143 and 142 of switch 136 to contact point 155 of the controller. If the controller is moved in the direction corresponding with a movement to the left in Fig. 18, lead line A will be connected with contact point 152 through a bridging connection from where it leads to point 153 of the motor; similarly, lead line C will lead to contact point 156 through a bridging connection from where it passes to point 157 of the motor. If the direction of movement of the controller corresponds to a movement toward the right in Fig. 18, lead line A will be connected with contact point 156 through the bridging connection and from there to point 157 of the motor; while line C will be connected to contact point 152 through the bridging connection and thence to point 153 on the motor, thus reversing the connection of the lead lines A and C.

Solenoids 13 and 44, which are adapted to release the brake mechanisms of the respective motors, are energized by the completions of the circuits, these solenoids being connected across pairs of lines.

As pointed out, the movement of the hoist motor is dependent upon the switches 136, 145 and 148, each being closed; if either of these is open by reason of the improper positioning of parts, the circuit to the hoist motor cannot be completed and no hoist operation is possible.

Fig. 19 shows a wiring diagram of the circuits operating in connection with the carriage and scoop motors 50 and 67 respectively. These motors operate intermittently and in timed relationship, providing a cycle of operations which cover the operation of the two charging mechanisms, viz. the carriage mechanism and the scoop mechanism. The start of operation of this cycle is controlled by the operator through manipulation of the carriage controller 163, this latter controller having a spring return, and being provided with a suitable latch mechanism which becomes operative by the movement of the handle of the controller in one direction, the direction of movement in Fig. 19 being toward the right, the locking action taking place when the handle has moved a distance sufficient to connect the contact points 164 and 165 by the bridging connection operated by the handle. The handle is released and automatically returned by the tripping of the locking mechanism energizing of solenoid 178 as presently described.

Assuming the charging machine to be properly lined up in front of the retort ready for the charging operation, both motors 50 and 67 being inactive, the sequence of operation through the cycle, and the various connections with the lead lines A, B and C are as follows: lead line A being connected direct to the motors, the various changes being provided in lead lines B and C.

The first operation in the cycle is the forward movement of the carriage, and this movement is inaugurated by the movement of the handle of switch 163 toward the right, in which position it is latched. At this time, each of the switches 160, 161 and 162 is open, 159 is closed and the fingers of the automatic switch 149 are in the position indicated as "scoops aright".

The movement of the switch 163 toward the right begins the operation of the motor 50 to move the carriage forward by energizing solenoid 167 as follows:—lead line A to contact point 164, controller 163, contact point 165, point 166, solenoid 167, point 169, point 170, to lead line B. This energizing of solenoid 167 results in closing the switch 168 in a direction to cause the motor 50 to rotate in the proper direction to move the carriage forward, this switch 168 being held closed as long as the solenoid 167 is being energized. This action begins the forward movement of the carriage, and thus has the effect of opening the switch 148 (Fig. 18), and at the same time, switch 159 (which had been closed at the end of the previous return movement of the carriage) is opened by wheel 48.

As the carriage travels forward, the wheel 48 contacts with and closes switch 160, but as the circuit through this switch is broken in the automatic switch 149, the closing of switch 160 is ineffective at this time. As the carriage continues its forward movement, the wheel 48 reaches and closes switch 161 (which is an automatic return switch). The closing of switch 161 has the effect of energizing solenoid 178 as follows:—from lead line A to point 164, solenoid 178, point 177, contact points 176 and 175 of switch 161, to line C, the energizing of solenoid 178 acting to trip the locking mechanism of the controller 163 which then returns to its neutral position, breaking the circuit through solenoid 167 and thus breaking the motor circuit at switch 168. As the switch 161 is an automatic return switch, its action is short, the switch breaking the circuit as soon as the wheel 48 passes out of contact. This stops the motor 50, and the carriage coasts through the remainder of its travel to its carriage forward position. When the carriage reaches this position, the wheel 48 operates switch 162 to close the circuit in that switch, whereupon the circuit for the scoop motor is automatically completed as follows; (it being under stood that the automatic switch 149 has been held stationary during these described operations, this switch operating only when the scoop motor itself operates): from lead line A to the bar 173 of automatic switch 149, to bar 180, contacts 181 and 182 of switch 162, point 183, point 184, point 185, to solenoid 186, point 188, point 189 to lead line B, thus energizing solenoid 186 which in turn closes the switch 187 to start the movement of the scoop motor 67 in the direction to dump the scoops, this movement continuing until contact is broken between bars 173 and 180 of automatic switch 149 by the travel of the automatic switch, thus breaking the circuit through switch 162 and solenoid 186, the result being that the motor 67 stops its movement, leaving the scoops in inverted position with the charge dumped into the retort.

At the time of breaking the circuit through the scoop motor, the automatic switch 149 has brought bars 174 and 190 into connection with bar 173, the result being the establishment of a circuit through switch 160 and the closing of the circuit to motor 50 to cause it to move in the opposite direction to return the carriage, this circuit being completed in the following manner: from lead line A to bar 173, bar 190, contact points 191 and 192 of switch 160, point 193, point 194, solenoid 195, point 169, point 170 to lead line B, thus energizing solenoid 195 which operates switch 168 to provide the proper line connections of lead lines B and C to the motor 50 to provide the return movement of the carriage. While bar 174 is also brought into operation at this time, switch 159 is open so that the circuit, of which the bar 174 is a part is broken.

As the carriage begins its return movement, it opens switch 162 through the action of wheel 48, reaches switch 161 and temporarily closes this switch without effect (the locking mechanism of controller 163 not being active), finally reaching and opening switch 160, the switch which started the return movement. The effect of this is to break the energizing circuit of solenoid 195 and open switch 168 to stop the movements of motor 50. The carriage then coasts to its rear position, the wheel 48 acting to close switch 159, the closing of which effects an energizing of solenoid 186 through a circuit running from lead line A to bar 173, bar 174, contacts 196 and 197 of switch 159, point 183, point 184, point 185, solenoid 186, point 188, point 199 to lead line B. The energizing of this circuit again closes the circuit to motor 67 which has the effect of again starting the turning movement of the scoops to place them in their "aright" position, the movement of motor 67 continuing the movement of switch 149 until the finger of bar 174 coasts off of that bar, whereupon the circuit is broken within the automatic switch 149 and the motor 67 stops its movement with the scoops in their aright position, leaving the automatic switch in starting position for the next operation, also leaving switch 159 closed. This closes the cycle of charging operations, during which the successive operations were brought into activity in timed relation and without manipulation of the operator other than the initial movement of the switch 163.

Provision is made for providing an operation of the motor 50, to return the carriage at the will of the operator by the controller 163 which, if moved in the opposite direction (to the left in Fig. 19) will bridge contact points 164 and 198 and thus energize solenoid 195 from lead line A to contact point 164, through the bridging connection of the controller to contact point 198, point 193, point 194, solenoid 195, point 169, point 170, to lead line B thus closing the switch 168 to cause the motor to travel in a direction which will provide a return movement to the carriage. This provision acts somewhat as a safety or emergency device in permitting the carriage to be returned before reaching the end of its forward movement, thus reducing the liability of damage to the equipment in case of accident. Provision is also made for providing manual controller operation of the scoop motor, through controller 199. If the handle of this controller be moved toward the right in Fig. 19, a circuit will be completed through solenoid 186 from line A to contact point 200, through bridging connection of controller 199 to contact point 201, point 185, solenoid 186, point 188, point 189, to line B, thus energizing solenoid 186 and closing switch 187 to drive the motor in the direction normally employed in the scoop operation. Should any condition arise which would require a reversal in the direction of rotation of motor 67, a movement of the handle of switch 199 toward the left would have the effect of completing a circuit to energize solenoid 204, the circuit running from lead line A, contact point 202, through the bridging connection of controller 199 to contact point 202, to point 203, solenoid 204, point 188, point 189, to line B, the energizing of solenoid 204 reversing the connections to motor 67 in the switch 187, and thus causing this motor to rotate in the reverse direction.

Solenoids 86 and 171 are energized when the motor circuits are completed, and like previously referred to solenoids, act to release the brakes which are provided in connection with the respective motors.

The controlling and operating circuits for the feeder motor are shown in Fig. 20. This motor operates only in one direction, consequently, the controller for this motor indicated at 205, has but two contact points 206 and 207 which when bridged by the movement of the controller, act to connect lead line A with lead line C in the following manner:—from lead line A to contact point 206 through the controller to contact point 207 to point 208, through solenoid 209, to point 211, point 212, to lead line C. This has the effect of energizing solenoid 209 which closes lead lines A and C to motor 89, lead line B running direct to the motor, and starts the operation. Motor 89 serves to operate the feeder mechanism as heretofore pointed out. The period of activity of the motor 89 is controlled by the length of time the solenoid 209 remains energized. This period is controlled by the combined action of the controller 205 and switch 213, the latter being operated by the motor 89, and being arranged to become active after the motor 89 has started its operation, the controller 205 being held in its circuit-making position a sufficient length of time to bridge the break which is provided between the initial starting of the motor and the time when the switch is brought into operation. The switch takes up the energizing of solenoid 209 started by manipulation of the controller 205, and the close of the energizing period is controlled entirely by the switch.

Solenoid 118 acts, like previously described solenoids, to release the brake for the feeder mechanism during the period that the motor circuit is active.

From the above description, it will be understood that each of the principal mechanisms is operated by an independent motor with the motor operations controlled independently either manually or automatically or a combination of both. For instance, the travel, the hoist, the charging (as an entirety), and the feeder operations are each brought into action at the will of the operator, subject to certain limitations in the way of protective devices, the principal of which is that provided by the hoist and travel safety switch 148 which prevents movements of the apparatus at a time when such movement would result in damage to the retort house equipment. On the contrary, the operations of the several mechanisms which provide the charging operation are under automatic control (excepting the emergency operation provided by the movement of the controller 163 toward the left in Fig. 19), this control providing a fixed sequence of operations brought into activity through simple and efficient control mechanism, the effect of which is to provide the successive operations with the least possible delay, and thus complete the charging operation in a minimum amount of time, a result particularly advantageous in that the length of time the retort is required to remain open for the charging operation is reduced to a minimum, all delays being eliminated and each mechanism having its separate motor which is not required to take care of the manipulation of a different mechanism. Furthermore, this automatic control eliminates any liability of error in control manipulation by the operator, the sequence of operations not being provided at will by individual control mechanism, the operator simply starting the operation which is automatically continued through these automatic controls.

The particular control mechanisms above described are not specifically claimed herein, the same being disclosed and claimed in a divisional application filed October 3, 1914, Serial Number 864,787.

Having described our invention, what we claim and desire to secure by Letters Patent is—

1. In a machine for charging and discharging gas retorts, the combination with a supporting frame, a track supported by said frame, a carriage mounted on the track, a scoop carried by the carriage, means for reciprocating the carriage, hoist mechanism for vertically adjusting the track, operable means for the hoist mechanism, and automatically operable means for preventing the vertical movement of the track while the scoop is in its extended forward position.

2. In a machine for charging and discharging gas retorts, and in combination, a supporting frame, a vertically adjustable track carried by said frame, a carriage movable upon the track, a hollow ram structure mounted upon the carriage and adapted to form a receptacle for coal when the structure is distended, said ram structure comprising complemental scoop members pivotally supported to permit distending and nesting movements of the members, means including a hollow shaft, a shaft within the hollow shaft, and coöperating gearing for moving the scoop members between the distended and nested positions, and means for moving the carriage upon the track.

3. In a machine for charging and discharging gas retorts, the combination of a supporting frame, a track upon the supporting frame, a carriage mounted upon the track, a hollow ram structure mounted upon the carriage and comprising a pair of complemental pivotally mounted scoop members mounted to turn about a concentric axis, the said complemental scoop members forming a receptacle for coal when in one position, means for moving the carriage to force the ram into and out of a retort, and means for rotating the complemental scoop members to and from the receptacle-forming position, said means including concentric shafts and coöperating gearing.

4. In a machine for charging and discharging gas retorts, the combination of a supporting frame, a track mounted thereon, a carriage movable upon the track, a hollow ram upon the carriage, a shaft arranged parallel to the path of the carriage, a gear member rotatable with the shaft and slidable thereon so as to travel with the carriage, an operative connection between the said gear member and the hollow ram for discharging the contents of the hollow ram into the retort, means for moving the carriage, and means for turning the shaft.

5. In a machine for charging and discharging gas retorts, the combination of a supporting frame, a track mounted thereon, a carriage movable upon the track, a hollow ram upon the carriage, a rotatable shaft arranged to one side of and parallel to the path of the carriage, a member rotatable with the shaft and slidable thereon so as to travel with the carriage, an operative connection between the said member and the hollow ram for discharging the contents of the hollow ram into the retort, and means for turning the shaft.

6. In a machine for charging and discharging gas retorts, the combination of a supporting frame, a track mounted thereon, a carriage movable on the track, a shaft arranged parallel to the path of the carriage, a gear member rotatable with the shaft and slidable thereon, a hollow ram mounted upon the carriage and comprising complemental pivotally mounted scoop members adapted to receive a coal charge for the retort, the said scoop members having an operative connection with the gear member upon the shaft whereby the coal charge within the scoop members can be discharged by rotating the shaft, means for rotating the shaft, and means for moving the carriage.

7. In a machine for charging and discharging gas retorts, the combination of a supporting frame, a track mounted thereon, a carriage movable on the track, a hollow ram carried by the carriage, means for moving the carriage to force the ram into and out of a retort, a shaft arranged parallel to the path of the carriage, means actuated by rotation of the shaft for causing the hollow ram to discharge the contents thereof, the time of operation of said means being controlled by the carriage and gearing for driving the shaft.

8. In a machine for charging and discharging gas retorts, the combination of a supporting frame, a track mounted thereon, a carriage movable on the track, a hollow ram mounted upon the carriage and comprising complemental pivotally mounted scoop members adapted to receive a coal charge for a retort, means for moving the carriage to force the ram into and out of the retort, a shaft extending parallel to the path of the carriage, a gear rotatable with the shaft and slidable thereon so as to travel with the carriage, an operative connection between the gear and the scoop members whereby the scoop members may be thrown apart and drawn together by rotation of the shaft in opposite directions, a pinion upon the shaft, and a reciprocating rack member engaging the pinion.

9. In a machine for charging and discharging gas retorts, the combination of a movable supporting frame, means for moving the supporting frame, a track on said frame, a carriage mounted on the track, a scoop carried by the carriage, means for reciprocating the carriage and scoop, hoisting mechanism for vertically adjusting the track, operable means for the hoisting mechanism, and automatically operable means for preventing movement of the supporting frame and hoisting mechanism while the scoop is in its extended forward position.

10. In a machine for charging and discharging gas retorts, the combination of a supporting frame, a track mounted thereon, a carriage movable on the track, a pair of concentric shafts upon the carriage, a hollow ram structure mounted upon the carriage and comprising complemental scoop members connected to the respective concentric shafts, gearing connected to the shafts for operating the complemental members of the ram, and means for moving the carriage to force the ram into and out of the retort.

11. In a machine for charging and discharging gas retorts, the combination of a supporting frame, a track mounted thereon, a carriage movable on the track, a hollow shaft upon the carriage, a second shaft within the hollow shaft, a hollow ram structure carried by the carriage and comprising complemental scoop members connected respectively to the hollow shaft and the shaft within the hollow shaft, gearing for turning the shafts for nesting the scoop members or throwing the scoop members apart, and means for moving the carriage to force the ram into and out of a retort.

12. In a machine for charging and discharging gas retorts and in combination, a supporting frame, a track mounted thereon, a carriage movable on the track, a hollow ram structure comprising complemental scoop-members adapted to receive coal for a retort, means for moving the carriage to force the ram into and out of the retort, and means for operating the scoop members to distend or to nest them, said means including a hollow shaft carried by the carriage, a shaft journaled in said hollow shaft, said shafts being connected to the scoop members, a drive shaft extending parallel to the path of the carriage, a gear member slidable thereon and adapted to be driven thereby, said gear being operatively connected to the scoop shafts, and means for turning said drive shaft.

13. In a machine for charging and discharging gas retorts and in combination, a supporting frame, a track mounted thereon, a carriage movable on the track, a hollow ram structure comprising complemental scoop-members adapted to receive coal for a retort, means for moving the carriage to force the ram into and out of the retort, and means for operating the scoop members to distend or to nest them, said means including a hollow shaft carried by the carriage, a shaft journaled in said hollow shaft, said shafts being connected to the scoop members, a drive shaft extending parallel to the path of the carriage, a gear member slidable thereon and adapted to be driven thereby, said gear being operatively connected to the scoop shafts, and means for turning said drive shaft, said scoop shafts having coöperating elements engageable and disengageable under the turning movements of the slidable gear member.

14. In a machine for charging and discharging gas retorts, the combination of a supporting frame, a track mounted thereon, a carriage movable on the track, a hollow ram mounted upon the carriage and adapted to receive a charge of coal for a retort, carriage operating mechanism for moving the carriage to force the ram into and out of a retort, a motor for driving the carriage operating mechanism, and a friction clutch between the motor and the carriage operating mechanism to admit of the carriage stopping independently of the motor should unusual resistance be encountered by the ram.

15. In a machine for charging and discharging gas retorts, the combination of a supporting frame, a track mounted thereon, a carriage movable on the track, a hollow ram mounted upon the carriage and adapted to receive a coal charge for a retort, a screw for feeding the carriage, a motor for driving the screw, and a friction clutch between the motor and the screw to admit of the carriage stopping independently of the motor should unusual resistance be encountered by the ram.

16. In a machine for charging and discharging gas retorts, the combination of a supporting frame, a track mounted thereon, a hopper mounted upon the frame, a carriage movable on the track, a hollow ram mounted upon the carriage and comprising complemental pivotally mounted scoop members adapted to receive a coal charge for the retort, means for moving the carriage to force the ram into and out of the retort, means for filling the ram with predetermined quantities of coal from the hopper, a shaft extending parallel to the path of the carriage, a gear rotatable with the shaft and slidably thereon so as to travel with the carriage, and an operative connection between the gear member and the scoop members whereby the scoop members may be given relative movements by rotation of the shaft.

17. In a machine for charging and discharging gas retorts and in combination, a supporting frame, a track mounted thereon, a carriage movable on the track, a hollow ram mounted on the carriage and movable therewith and comprising a pair of structures each embodying complemental scoop members movable between distended and nested positions by relative movements of the members, each member having a shaft, the shafts of a pair of members being concentrically arranged, said latter shafts having coöperating elements adapted to be engaged and disengaged by turning movements of one of the shafts, a drive shaft extending parallel to the path of the carriage, a gear member slidable thereon and adapted to be driven thereby, said gear member being operatively connected to one of the member shafts of each ram structure to cause said structures to move in unison, and means for turning said drive shaft.

18. The combination of a retort charging machine having travel mechanism, hoist mechanism, and charging mechanism, individual means for each mechanism for operating it at will, and means coöperating with the operating means of the travel and hoist mechanisms for preventing the operation of either of the last-named means during the activity of the charging mechanism.

19. The combination of a retort-charging machine having travel mechanism, hoist mechanism, and charging mechanism, individual means for each mechanism for operating it at will, and means coöperating with the operating means of the travel and hoist mechanisms for preventing the operation of either of the last-named means during the activity of the charging mechanism, said preventing means being controlled by the charging mechanism.

20. In a retort-charging machine and in combination, carriage mechanism, scoop mechanism, each of said mechanisms being independently driven, and means for providing a cycle of operations of said mechanisms automatically, said means providing a control of the operations of the power devices of said mechanisms to prevent overlapping of movements of said devices, said means including mechanism operated by the movement of the scoop power device for automatically beginning the return travel movement of the carriage power device.

21. In a retort-charging machine and in combination, carriage mechanism, scoop mechanism, each of said mechanisms being independently driven, and means for providing a cycle of operations of said mechanisms automatically, said means including mechanism operated by movements of the scoop mechanism for beginning the return travel movement of the carriage, whereby overlapping movements of the carriage and scoop mechanism movements will be prevented and such movements will be successive without dwell between movements.

22. In a retort charging machine and in combination, scoop mechanism, a traveling support therefor adapted to enter and withdraw the scoop structure into and from a retort, said scoop mechanism comprising a scoop member, a motor, and connections between said member and the motor for oscillating the member by rotational movements of the motor in one direction.

23. In a retort charging machine and in combination, a pair of scoop members operatively connected to move in unison, the movement of one member being in a direction opposite to that of the other member, a shaft operatively connected to said scoop members, a motor, and operative connections between the motor and said shaft for oscillating the latter by movements of the motor in one direction, whereby the scoop members will be moved from a position to form a receptacle for receiving the charge of coal to a position to dump the coal, the members passing through the charge during such movement.

24. In a retort charging machine and in combination, a pair of scoop members operatively connected to move in unison, the movement of one member being in a direction opposite to that of the other member, a shaft operatively connected to said scoop members, a motor, and operative connections between the motor and said shaft for oscillating the latter by movements of the motor in one direction, whereby the scoop members will be moved from a position to form a receptacle for receiving the charge of coal to a position to dump the coal, the members passing through the charge during such movement, said means including a crank, a gear connected to the shaft, and a floating rack connected to the crank and coöperating with the gear.

In testimony whereof, we have hereunto signed our names in the presence of two subscribing witnesses.

HENRY A. CARPENTER.
ROBERT L. HIBBARD.

In the presence of—
CLARENCE A. WILLIAMS,
JOHN H. RONEY.